MULTI-APERTURE CORE COINCIDENCE MEMORY

Filed July 10, 1963 2 Sheets-Sheet 1

INVENTORS
Bradford O. Van Ness
William B. Buehrle
BY
Mueller & Aichele
ATTY'S

MULTI-APERTURE CORE COINCIDENCE MEMORY

Filed July 10, 1963 2 Sheets-Sheet 2

*INVENTORS*
*Bradford O. Van Ness*
*William B. Buehrle*
*BY* Mueller & Aichele
*ATTY'S.*

United States Patent Office 3,292,166
Patented Dec. 13, 1966

3,292,166
MULTI-APERTURE CORE COINCIDENCE MEMORY

Bradford O. Van Ness, Phoenix, and William B. Buehrle, Scottsdale, Ariz., assignors to Motorola, Inc., Chicago, Ill., a corporation of Illinois Filed July 10, 1963, Ser. No. 294,004
9 Claims. (Cl. 340—174)

This invention relates to magnetic devices, and in particular relates to an improved magnetic memory device of the coincidence type.

Magnetic cores are often used in the storage matrices of computing equipment. Random access to the cores is achieved by the use of coincident currents in "reading" or "selection" circuits which include certain windings of the cores.

A typical grid array using toroidal cores is composed of horizontal and vertical reading circuits threading the cores such that information can be read out of a selected core by concurrently energizing two reading circuits threading that particular core.

Coincident memory devices which use simple toroid cores are critically dependent on the switching characteristics of the magnetic material (ferrite) from which they are made. Such ferrite cores have "square" hysteresis loops, and thus are capable of assuming either of two magnetic states. For a good square loop ferrite, the squareness ratio must be greater than 0.8 and ideally should approach unity. The squareness ratio of a ferrite toroid is defined as follows:

$$R_s = \frac{B_r}{B_m} > 0.8$$

where $R_s$=squareness ratio.

$B_m$=saturation flux density for an applied coercive force greater than twice the coercive force at the threshold point of the hysteresis loop.

$B_r$=remanent flux density retained after removal of exciting current.

In addition, the hysteresis loop should have steep sides (i.e., nearly vertical), and sharp corners.

Ferrite materials which are commercially available at the present time do not satisfy these requirements to the extent desired for some applications. As a result, electrical noise is generated in the outputs of the cores and the signal-to-noise ratio in the outputs is poor. Noise is defined herein as a signal produced in the output of a device at a time when no output signal should be present.

Multiaperture cores have also been used in coincidence memory systems, but such systems, like those using simple toroids, suffer from noise problems due to deficiencies in presently available ferrites. There are two hysteresis loops of interest in a multiaperture core; i.e., the loop for a flux path about the large or "major" aperture of the core, and the loop for the flux path about a smaller or "minor" aperture. Sometimes, the nature of these loops is such that the sides of the smaller loop overlap those of the larger loop, and again the corners of the loops are not as sharp nor the sides as steep as desired.

If there is such overlapping, some unwanted flux switching may take place about the major aperture at a time when flux should be switched only about a minor aperture. In other words, the threshold characteristics of the major and minor apertures may not be separated enough to provide adequate isolation of the windings from each other, and this is another source of noise. In a coincidence memory system, inadequate isolation between windings will result in a noise signal in the output when either one of the two coincidence windings for a given core has been excited, whereas an output signal should appear only when both coincidence windings are energized concurrently after the core has been set.

Th coincidence memory device of this invention uses a multi-aperture core which provides noise cancellation in its output winding, such that the threshold characteristics of the ferrite material of the core are not as critical as is the case with simple toroidal cores and multi-aperture cores of the prior art. The noise reduction makes it possible to build equipment using these cores which will operate reliably over a wider range of temperature than prior art systems. Such equipment can be installed in field conditions where a wide range of temperature is expected.

In addition to noise cancellation, the multi-aperture core to be described herein is capable of providing two distinguishable output signals, other than the absence of a signal, and it will be referred to as a "true and complement" core since one of its output signals is the complement of the other.

The true and complement core is an invention of Lawrence R. Smith and is described and claimed in a copending application, Serial No. 109,440, filed on May 11, 1961, now Patent Number 3,217,300. The present invention is a new coincidence memory device which takes advantage of the very desirable features of the true and complement core, and thus allows new coincidence memory systems to be built which can operate with bipolarity input and output signals, and which are not plagued with noise problems. Logic can be stored in the memory in three states: "one," "zero" or "neuter." The neuter state is that in which input and output signals are absent. A distinctive feature of the true and complement coincidence memory is that the amplitude of coincident current pulses must meet only a minimum value requirement rather than being restricted to a narrow range of current between upper and lower limits.

The invention will be described with reference to the accompanying drawings, in which.

Before describing the invention in detal, certain terms to be used in this description and the claims which follow will be defined.

An "aperture" in a core is an opening extending through the material of the core which defines a closed-loop flux path in the material of the core.

A "minor aperture" is a small aperture in a core which divides the flux path about a larger aperture in the core into branches. The larger aperture is referred to herein as a "major aperture." The respective flux paths existing about major and minor apertures are referred to as "major flux path" and "minor flux path."

The "blocked" condition of a multi-aperture core is that in which flux is discontinuous about its minor apertures, and therefore cannot be reversed unless flux is also reversed about a major aperture. A multi-aperture core is ordinarily established in the blocked condition before logic is performed by it. The blocking function is sometimes referred to as "clearing."

"Setting" is the process of loading information into a core. A multi-aperture core may be "set" by exciting an input winding to establish continuous flux about an output minor aperture. The absence of an input signal at setting time can also "set" the core, and as will be described, a "neuter" bit can be loaded into a true and complement core in this manner.

"Priming" a multi-aperture core is the process of exciting it such that if there is continuous flux about a minor aperture, that flux will be reversed without changing the information content of the core. For instance, a core may be primed in order to put it into a desired condition for transferring information from it to a succeeding core without coupling an undesired signal back into the input source.

"Reading" is the process of deriving information from a core which has been set. The reading and blocking functions are sometimes combined. When the information has been read out is supplied to another device, the reading function is often called "transfer."

Figure 1:
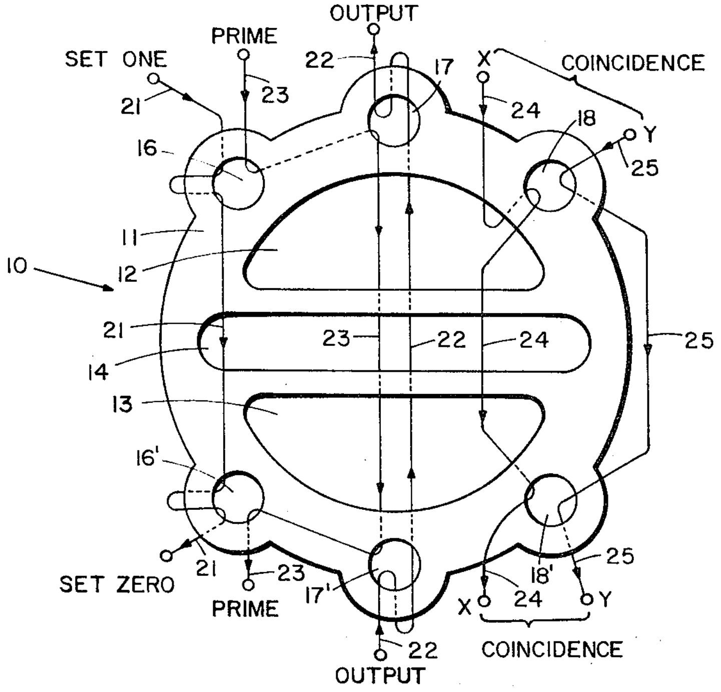
FIG. 1 is a schematic diagram of a true and complement coincidence memory device which constitutes one embodiment of the invention.

Referring now to FIG. 1, there is shown a true and complement coincidence memory device 10 in accordance with the invention. The device 10 includes a multi-aperture core 11 of the type described and claimed in the aforementioned copending application of L. R. Smith. The core 11 is made of square-loop ferrite material having the desired characteristics outlined previously in this specification. Stated briefly, the core has relatively high flux retentivity, and this is the fundamental material characteristic which makes it suitable for memory and logic applications. The core has an upper section, as viewed in FIG. 1, which includes a major aperture 12, and a lower section including another major aperture 13. The core material around these major apertures provides the major flux paths of the device. There is another aperture 14 between the major apertures 12 and 13, which serves to substantially isolate the two major flux paths from each other.

This particular core has six minor apertures. There are three minor apertures 16, 17 and 18 in the upper section of the core, and three more minor apertures 16', 17' and 18' in the lower section of the core. These minor apertures are located in the respective major flux paths, and they divide the major flux paths into branches or legs, and also define minor flux paths in the material about the minor apertures.

The minor apertures are separated from each other enough to provide a substantial degree of isolation between windings linking different minor apertures. This isolation between windings is a key feature of multi-aperture cores which makes them advantageous over simple toroidal cores. As a consequence, when flux is switched about a minor aperture, flux will not be switched about another minor aperture located in the same major flux path unless flux is also switched about the major flux path. This makes it possible to switch flux locally about a given minor aperture without destroying the information content of the core, and also means that information may be read-out or transferred from the core in the form of an output signal without having a spurious signal appear in the input circuit or some other circuit.

Two of the minor apertures, 16 and 16', are threaded by an input winding 21. The input winding links the outer legs at the minor apertures 16 and 16' in an opposed sense such that an input current in a given direction can switch flux in only one of the two sections of the core. The input current pulse has an amplitude sufficient to switch flux about one of the major flux paths, and therefore establishes continuous flux about the other minor apertures in that flux path. The flux switching will take place in either the upper section or the lower section of the core depending on the polarity of current in the input winding.

For purposes of this specification, positive current represents a "one" bit, and the positive direction is indicated by arrows on the various windings. Negative current represents a "zero" bit and, of course, is in the direction opposite to the arrows on the windings. Positive current in the input winding 21 sets a "one" bit in the core; negative current in this winding sets a "zero" bit in the core; and no current at setting time will set a "neuter" bit in the core. The manner in which flux is switched will be explained more fully in connection with the description of FIGS. 3 through 10.

The output winding 22 for the core threads the two minor apertures 17 and 17' and links the outer legs at those apertures in an opposed sense. Due to the series-opposition linking of the minor flux paths about apertures 17 and 17', spurious flux switched about one of these apertures will be balanced or cancelled by an equal amount of spurious flux switching at the other aperture. In this way, noise is cancelled from the output; a very important characteristic of the true and complement device.

The input and output apertures 16, 16', 17 and 17' are also threaded by a priming winding 23. Positive current in the priming winding is used to reverse flux locally about the minor apertures threaded by this winding without destroying or changing the information content of the core. The purpose of priming is to assure that no signal will be produced in the input winding 21 when an output is read out of the core. The priming current pulse is controlled in amplitude to exceed the coercive force required to switch flux about a minor aperture and yet not exceed the coercive force required to switch flux about a major aperture. Thus, flux will be switched slowly by the priming current only about a minor aperture which has continuous flux about it.

Information is read out of the core by concurrently energizing the two coincidence windings 24 and 25 which thread the other two minor apertures 18 and 18'. Winding 24 links the inner legs at apertures 18 and 18', and winding 25 links the outer legs at these apertures. When these two windings are energized in time coincidence, they will block the core and also cause whatever information is stored in the core to be read out in the form of a positive signal, negative signal or absence of a signal in the output winding 22. A "one" output will be in the form of positive current in the output winding; a "zero" output will be in the form of negative current in the output winding; and a "neuter" output will be in the form of no current at read time.

Since the core is read in a destructive manner, i.e., it is blocked as it is read, the amplitude of the coincidence current pulses in windings 24 and 25 need not be amplitude limited. This means that adequate power is available to produce a strong output signal in winding 22 at read time. Each coincidence current pulse must have sufficient amplitude to exceed the coercive force required to switch flux about a major flux path, but there is no severe maximum limitation on the coincidence current pulses. This helps to simplify the clocking circuitry for supplying the coincidence pulses.

Figure 2:
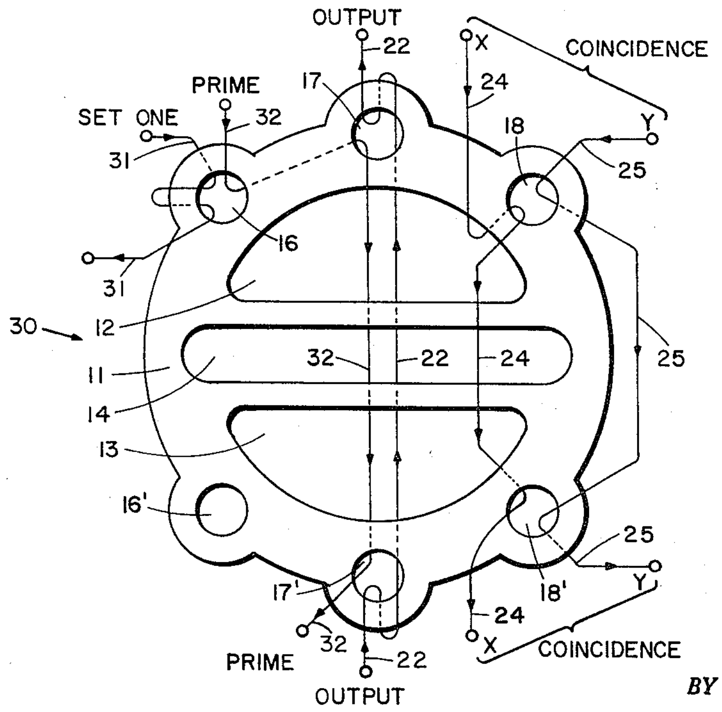
FIG. 2 is a schematic diagram showing another embodiment of the invention.

Modifications of the coincidence memory device 10 are possible. One such modification is shown in FIG. 2. Since the core and several of the windings are the same in FIGS. 1 and 2, the same reference numerals have been used for like parts. The only essential difference is that the input winding 31 links only one minor aperture, 16, in FIG. 2, whereas in FIG. 1 the input winding 21 links two minor apertures 16 and 16', one in each section of the core.

The coincidence memory device 30 of FIG. 2 is useful for applications in which bipolarity output signals are not required, but where it is still desired to obtain the advantages of noise cancellation in the output winding. The true and complement core 11 lends itself very nicely to such applications. It has two major flux paths with at least one output aperture in each of those flux paths, so it is a simple matter to provide an output winding which links the two output apertures in an opposed sense. Of equal importance is the fact that the core 11 is all made of the same material which ensures that if spurious flux is switched in one section of the core, an equal amount of spurious flux will be switched in the other section so that effective noise cancellation will be realized. If separate cores were used, it would be necessary to match the material of the two cores very closely in order to obtain equivalent results, and one would still not have the other advantages of a one-piece core construction.

Since there is no input winding threading aperture 16′ of the memory device 30, there is no need for the priming winding to link this aperture. As shown in FIG. 2, the priming winding 32 threads only apertures 16, 17 and 17′. In fact, aperture 16′ could be omitted for this particular device.

It will be apparent from inspection of FIGS. 1 and 2 that a separate input winding could be provided for aperture 16′ in FIG. 2 if desired. In this manner it would be possible to provide true and complement operation of the device 30 with two separate input windings rather than a single input winding as in FIG. 1. However, for true and complement operation the single input winding 21 of FIG. 1 is desirable since with this single winding it is possible to work with bipolarity input signals and output signals in a manner which simplifies interconnection of memory and logic devices.

FIGS. 3 through 10 illustrate different flux patterns which will be described in explaining the operation of and coincidence memory devices 10 and 30 of FIGS. 1 and 2. The windings of the core have been ommitted in FIGS. 3–10 in order to make the flux patterns more readily visible.

Figure 3:
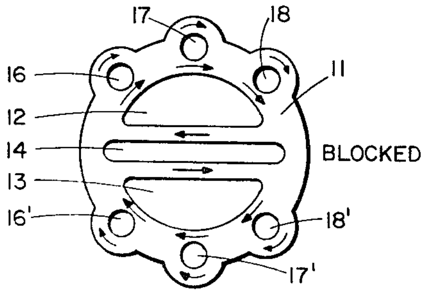
FIGS. 3 through 10 are simplified diagrams of the flux patterns produced in the core when the coincidene memory device is operated in a manner to be described.

FIG. 3 shows the blocked condition of the core. It is apparent that flux is continuous in a clockwise direction about both of the major apertures. Flux is discontinuous about all of the minor apertures. Thus, no flux can be switched about a minor aperture unless it is first switched about a major aperture.

Figure 4:
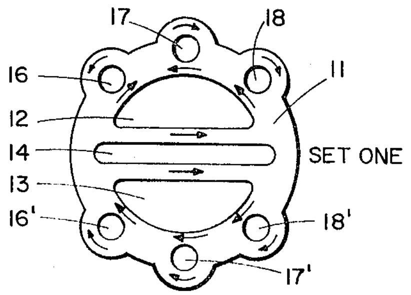
Figure 5:
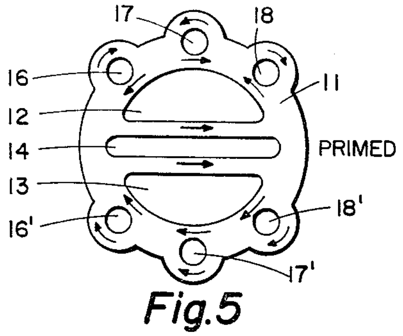

When a "one" bit is set into the core by energizing the input winding with positive current, the flux pattern changes to that shown in FIG. 4. Flux has been reversed at the outer leg of aperture 16, the inner legs of apertures 17 and 18, and also at the upper leg adjoining the isolating aperture 14. A "one" bit has now been loaded into the core. Flux is continuous about all of the minor apertures in the upper section of the core, but the flux pattern has not changed in the lower section of the core. This is true of both illustrated embodiments, since in the embodiment of FIG. 1 positive current in the input winding 21 is in a sense to further saturate the lower major flux path in the clockwise direction, and in FIG. 2 there is no input winding linking the lower section of the core.

The core is next primed in order to condition it for reading, and this is accomplished by applying a positive current pulse to the priming winding 23 or 32 as the case may be. The primed condition of the core is illustrated by the flux pattern shown in FIG. 5. It may be seen that flux has been reversed about apertures 16 and 17 in the upper section of the core, but has not been reversed about aperture 18 in that section. No flex switching has taken place in the lower section of the core. Once the core has been primed, flux can be switched about aperture 18 without producing an undesired signal in the input circuit.

Figure 6:
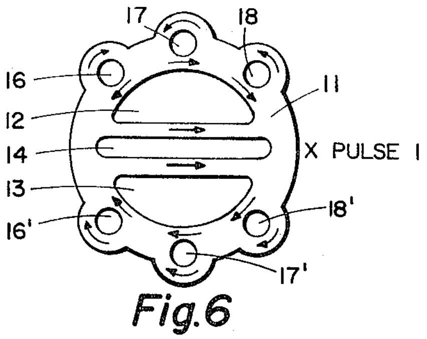
Figure 7:
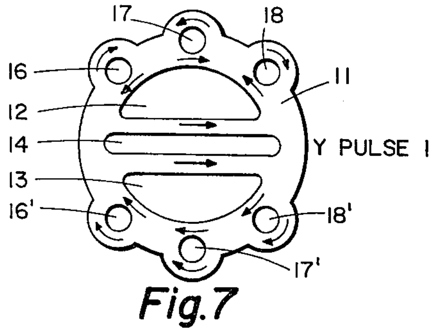
Figure 8:
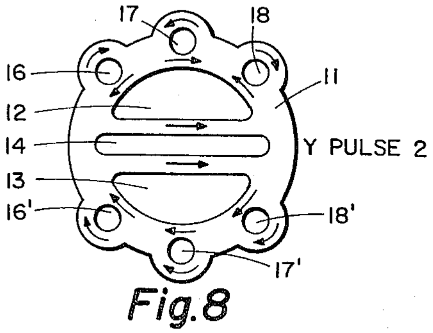
Figure 9:
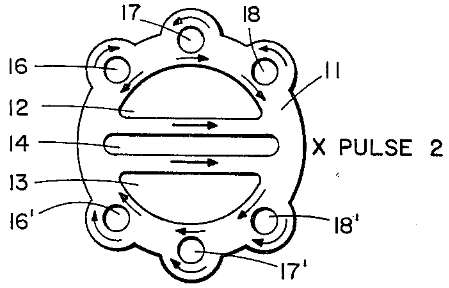
Figure 10:
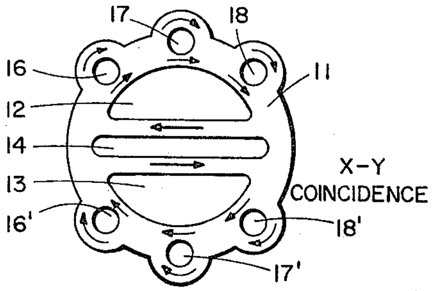

If a current pulse is now supplied to the coincidence winding 24, but not to the other coincidence winding 25, flux will be reversed about aperture 18 but no output will be produced in the output winding 22. The resulting condition of the core is shown in FIG. 6, and as indicated, this is the condition after an "X" pulse has been applied to winding 24. Now if a "Y" pulse is applied to the other coincidence winding 25, flux will again be reversed about aperture 18 without producing an output signal. The condition after "Y" pulse No. 1 is shown in FIG. 7. FIG. 8 shows that if another "Y" pulse is applied to winding 25, the condition of the core will not change, and a subsequent "X" pulse on winding 24 will again only reverse the flux about aperture 18 as shown in FIG. 9.

The coincidence operation may take place at any time subsequent to priming, and intervening non-coincidence pulses on windings 24 and 25 will not produce an output in winding 22. When current pulses occur on windings 24 and 25 in time coincidence, the flux about the minor aperture cannot switch, but if each current is above a minimum value the flux about the major aperture 12 will be switched and an output signal is produced in winding 22. The polarity of this output signal depends upon which half of the core has been set, and in the example being described, positive current will be produced in winding 22, as indicated by the arrow, since the upper half of the core has been set by a "one" input. It will be obvious that the negative output in winding 22 is obtained after a "zero" input, and in this case flux switching takes place in the lower section of the core. The absence of an output signal at the time of coincidence reading is a "neuter" output, as previously mentioned, and in order to obtain this output information, the core must initially be set by the absence of an input signal at setting time.

With winding 24 linking the inner legs at apertures 18 and 18′ and winding 25 linking the outer legs at these same apertures, and with sufficient ampere turns on these legs, flux will be switched about the entire major flux path in the upper section of the core. By comparing FIGS. 9 and 10, it is apparent that flux has been reversed in the outer leg at aperture 17, and no flux has been switched in the outer leg at aperture 17′. Since there is a substantial net flux switching at these two apertures, an output signal is produced in the output winding 22. Thus, the output signal arises from a difference in the amount of flux switched at the two output apertures. When there is no flux switching at either aperture, or when only spurious flux is switched such that noise cancellation is obtained, no signal is produced in winding 22 and the information that has been read out of the core is a "neuter" bit. From this it is apparent that the device has three possible states which is advantageous over the usual two-state device used in logic and memory applications. Since noise is cancelled or avoided in the output, it is possible to connect several true and complement devices in cascade and provide flux gain between the devices without undue amplification of noise from one device to the next.

The invention is pointed out by the claims which follow.

We claim:

1. A magnetic memory device of the coincidence type, comprising a one-piece magnetic core having relatively high flux retentivity, said core having first and second major apertures therein each defining a major flux path in the core material about the same, and said core further having at least six minor apertures therein with three in each of said major flux paths and each defining a minor flux path in the core material about the same, each of said minor apertures being separated from the others enough to provide a substantial degree of isolation between said minor flux paths, an output winding passing in one direction through a first minor aperture in one of said major flux paths and passing in the opposite direction through a second minor aperture in the other of said major flux paths for effectively providing cancellation of electrical noise, an input winding passing through a third minor aperture in said one major flux path and a fourth minor aperture in said other major flux path, a priming winding passing through said first, second, third and fourth minor apertures, and two coincidence windings both passing through a fifth minor aperture in said one major flux path and a sixth minor aperture in said other major flux path, said fifth and sixth minor apertures each having two flux legs on opposite sides thereof, with one coincidence winding linking one such flux leg for each associated aperture and the other coincidence winding linking the other flux leg for each associated aperture.

2. A magnetic memory device of the coincidence type, comprising a one-piece magnetic core having relatively high flux retentivity, said core having first and second major apertures therein each defining a major flux path about the same, and said core further having at least five minor apertures therein with three in one of said major flux paths and two in the other major flux path, each of said minor apertures defining a minor flux path about the same and being separated from the others enough to provide a substantial degree of isolation between said minor flux paths, an output winding passing in one direction through a first minor aperture in one of said major flux paths and passing in the opposite direction through a second minor aperture in the other of said major flux paths for effectively providing cancellation of electrical noise, an input winding passing through a third minor aperture in said one major flux path, and two coincidence windings both passing through a fourth minor aperture in said one major flux path and a fifth minor aperture in said other major flux path.

3. A magnetic memory device, comprising a one-piece magnetic core having relatively high flux retentivity, said core having first and second major magnetic circuits therein isolated from each other to a substantial degree, and said core further having at least six minor apertures therein with three in each of said major magnetic circuits and each defining a minor magnetic circuit in the core material about the same, an output winding passing in one direction through a first minor aperture in one of said major magnetic circuits and passing in the opposite direction through a second minor aperture in the other of said major magnetic circuits so as to reduce electrical noise effects in said output winding in the operation of said device, an input winding passing through a third minor aperture in said one major magnetic circuit and a fourth minor aperture in said other major magnetic circuit, a priming winding passing through said first, second, third and fourth minor apertures, and two coincidence windings both passing through a fifth minor aperture in said one major magnetic circuit and a sixth minor aperture in said other major magnetic circuit, said coincidence windings being responsive to coincident energizing currents therein to provide an output current in said output winding of a given polarity when said core has been previously set by energizing current of selected polarity in said input winding and primed by energizing current in said priming winding in the operation of said device.

4. A magnetic memory device, comprising a one-piece magnetic core having relatively high flux retentivity, said core having first and second major magnetic circuits therein isolated from each other to a substantial degree, and said core further having at least six minor apertures therein with three in each of said major magnetic circuits, each of said minor apertures defining a minor magnetic circuit in the core material about the same and being separated from the others enough to provide effective isolation of said minor flux paths from each other, an output winding passing in one direction through a first minor aperture in one of said major magnetic circuits and passing in the opposite direction through a second minor aperture in the other of said major magnetic circuits so as to reduce electrical noise effects in said output winding in the operation of said device, an input winding passing through a third minor aperture in said one major magnetic circuit and a fourth minor aperture in said other major magnetic circuit, a priming winding passing through said first, second, third and fourth minor apertures, and two coincidence windings both passing through a fifth minor aperture in said one major magnetic circuit and a sixth minor aperture in said other major magnetic circuit, said coincidence windings being responsive to coincident energizing currents therein to provide an output current in said output winding of a given polarity when said core has been previously set by energizing current of selected polarity in said input winding and primed by energized current in said priming winding in the operation of said device.

5. A magnetic memory device, comprising a magnetic core having relatively high flux retentivity, said core having first and second major apertures therein each defining a major flux path about the same, and said core further having first, second and third minor apertures in one of said flux paths and fourth and fifth minor apertures in the other of said flux paths, an input winding passing through said first minor aperture, an output winding passing in one direction through said second minor aperture and passing in the opposite direction through said fourth minor aperture, and two coincidence windings both passing through said third minor aperture and said fifth minor aperture, said third and fifth minor apertures each having two flux legs on opposite sides thereof, with one coincidence winding linking one flux leg for each associated aperture and the other coincidence winding linking the other flux leg for each associated aperture.

6. A magnetic memory device, comprising a magnetic core having relatively high flux retentivity, said core having first and second major apertures therein each defining a major flux path about the same, and said core further having first, second and third minor apertures in one of said flux paths and fourth and fifth minor apertures in the other of said flux paths, an input winding passing through said first minor aperture, an output winding passing in one direction through said second minor aperture and passing in the opposite direction through said fourth minor aperture, a priming winding passing through said first, second and fourth minor apertures, and two coincidence windings both passing through said third minor aperture.

7. A magnetic memory device of the coincidence type, comprising a magnetic core having relatively high flux retentivity, said core having first and second major apertures therein each defining a major flux path in the core material about the same, and said core further having first, second and third minor apertures in one of said flux paths and fourth and fifth minor apertures in the other of said flux paths, said minor apertures being separated from each other enough to provide effective electrical isolation of said minor flux paths from each other, an input winding passing through said first minor aperture, an output winding passing in one direction through said second minor aperture and passing in the opposite direction through said fourth minor aperture, a priming winding passing through said first, second and fourth minor apertures, and two coincidence windings both passing through said third minor aperture and said fifth minor aperture.

8. A magnetic memory device, comprising magnetic core means having relatively high flux retentivity, said core means having first and second major apertures therein each defining a major flux path in the material about the same, and said core means further having at least three minor apertures in each of said major flux paths each defining a minor flux path in the material about the same, an output winding passing in one direction through a first minor aperture in one of said major flux paths and passing in the opposite direction through a second minor aperture in the other of said major flux paths so as to provide noise cancellation, an input winding passing through a third minor aperture in said one major flux path, a priming winding passing through said first, second and third minor apertures, and two coincidence windings both passing through a fourth minor aperture in said one major flux path and a fifth minor aperture in said other major flux path.

9. A magnetic memory device, comprising a one-piece magnetic core having relatively high flux retentivity, said core having first and second major apertures therein each defining a major flux path in the core material about the same, and said core further having at least six minor apertures therein with three in each of said major flux paths and each defining a minor flux path in the core material about the same, a first winding passing in one direction through a first minor aperture in one of said major flux paths and passing in the opposite direction through a second minor aperture in the other of said major flux paths, a second winding passing through a third minor aperture in said one major flux path and a fourth minor aperture in said other major flux path, a third winding passing through said first, second, third and fourth minor apertures, and two coincidence windings both passing through a fifth minor aperture in said one major flux path and a sixth minor aperture in said other major flux path, said fifth and sixth minor apertures each having two flux legs on opposite sides thereof, with one coincidence winding linking one flux leg for each associated aperture and the other coincidence winding linking the other flux leg for each associated aperture.

References Cited by the Examiner

UNITED STATES PATENTS

| | | | |
|---|---|---|---|
| 2,935,622 | 5/1960 | Crane | 307—88 |
| 3,026,421 | 3/1962 | Crane et al. | 307—88 |
| 3,219,986 | 11/1965 | Dowling | 340—174 |

TERRELL W. FEARS, *Acting Primary Examiner.*

S. URYNOWICZ, *Assistant Examiner.*